(12) United States Patent
Kinsky et al.

(10) Patent No.: US 7,558,274 B1
(45) Date of Patent: Jul. 7, 2009

(54) INTERWORKING OAM BETWEEN ETHERNET AND ATM/FRAME RELAY NETWORKS

(75) Inventors: David Kinsky, High Bridge, NJ (US); Stephen Holmgren, Little Silver, NJ (US)

(73) Assignee: AT&T Intellectual Property, II, L.P., Reno, NV (US)

( * ) Notice: Subject to any disclaimer, the term of this patent is extended or adjusted under 35 U.S.C. 154(b) by 1094 days.

(21) Appl. No.: 10/740,269

(22) Filed: Dec. 18, 2003

Related U.S. Application Data

(60) Provisional application No. 60/489,716, filed on Jul. 21, 2003.

(51) Int. Cl.
*H04L 12/28* (2006.01)
(52) U.S. Cl. .................. 370/395.54; 370/395.53; 370/401; 370/247; 370/392
(58) Field of Classification Search .............. 370/241, 370/395.53, 236.2, 395.54, 401, 247
See application file for complete search history.

(56) References Cited

U.S. PATENT DOCUMENTS

| | | | |
|---|---|---|---|
| 6,574,224 B1 | 6/2003 | Brueckheimer et al. | |
| 6,775,239 B1 * | 8/2004 | Akita et al. | 370/248 |
| 6,947,739 B2 * | 9/2005 | Yokoyama | 455/426.2 |
| 6,990,106 B2 * | 1/2006 | Bhatia | 370/395.53 |
| 7,009,983 B2 * | 3/2006 | Mancour | 370/401 |
| 7,113,512 B1 * | 9/2006 | Holmgren et al. | 370/395.53 |
| 7,386,010 B2 * | 6/2008 | Solomon et al. | 370/466 |
| 2002/0101870 A1 * | 8/2002 | Chase et al. | 370/389 |
| 2003/0053434 A1 | 3/2003 | Chow et al. | |
| 2003/0058827 A1 | 3/2003 | Chow et al. | |
| 2004/0160895 A1 * | 8/2004 | Holmgren et al. | 370/223 |
| 2004/0202199 A1 * | 10/2004 | Fischer et al. | 370/474 |
| 2005/0099949 A1 * | 5/2005 | Mohan et al. | 370/236.2 |
| 2005/0099951 A1 * | 5/2005 | Mohan et al. | 370/241 |
| 2005/0099952 A1 * | 5/2005 | Mohan et al. | 370/241 |

FOREIGN PATENT DOCUMENTS

EP         1320219 A2 *   6/2003

OTHER PUBLICATIONS

Alcatel; ("End-to-end Ethernet conectivity fault mangement in Metro and Access Networks"); Alcatel; pp. 1-10.*

* cited by examiner

*Primary Examiner*—Ricky Ngo
*Assistant Examiner*—Dewanda Samuel
(74) *Attorney, Agent, or Firm*—Hoffmann & Baron, LLP

(57) ABSTRACT

The present invention provides a network architecture that interworks OA&M (Operations, Administration and Maintenance) failure notification data from the ATM Domain to the Ethernet Domain and vice versa. Failure indications or notifications are typically routed from one domain to another within 1-2 seconds; providing service providers and customers the ability to react quickly to network faults. This enhances the overall quality of the Ethernet-to-ATM Interworking service and provides a similar level of reliability across the Ethernet/ATM/FR domains.

16 Claims, 12 Drawing Sheets

INTERWORKING OAM BETWEEN ETHERNET AND ATM/FRAME RELAY NETWORKS

CROSS-REFERENCE TO RELATED APPLICATIONS

This application claims priority to U.S. Provisional Application No. 60/489,716 filed Jul. 21, 2003.

The present application is related to United States utility patent applications, "ETHERNET TO ATM SERVICE INTERWORKING TECHNIQUE," Ser. No. 10/016,019, filed on Dec. 12, 2001; "FAILURE NOTIFICATION METHOD AND SYSTEM IN AN ETHERNET DOMAIN," Ser. No. 10/248,761, filed on Feb. 14, 2003; and "DISCOVERY AND INTEGRITY TESTING METHOD IN AN ETHERNET DOMAIN," Ser. No. 10/248,858, filed on Feb. 25, 2003, the contents of which are incorporated by reference herein.

FIELD OF THE INVENTION

The present invention relates to interworking data between Ethernet domains and ATM/Frame Relay domains and, more particularly, to integrating operations, administration, management (OAM) traffic failure data.

BACKGROUND OF THE INVENTION

Traditionally, for customers running IP networks, they typically rely on routing protocols such as Border Gateway Protocol (BGP), Open Shortest Path First (OSPF), Routing Information Protocol (RIP) also known as layer 3 IP Routing Protocols, to detect a failure in the network and route around the problem. These routing protocols send systematic "hello" messages to their remote end points and when one isn't observed after a period of time, they assume there's a problem and route around it. So, these Layer 3 IP Routing Protocols are needed to re-route around failures, such as between two separate networks like Ethernet and ATM. Using these Layer 3 techniques takes about 30-60 seconds to detect and respond to a failure. This is inefficient and too slow but that is a limitation of the Layer 3 routing protocols.

Customers who rely on Frame Relay/ATM networks are used to failure notification response times of 1-2 seconds (or less). The FR/ATM network independently generates a failure notification towards customer premises equipment at the onset of failure. Customers of this new Ethernet to FR/ATM Interworking service require similar failure notification behavior from the network. Therefore, it is required to integrate automated Operations, Administration and Management traffic which can propagate failure indications end-to-end much faster, and does not require either a Layer 3 IP Routing Protocol or any type of "hello" or integration timer messages.

It is known that regular traffic can be interworked between Ethernet and ATM, e.g. using the technique described in the patent application Ser. No. 10/016,019. It is also known that there is a native OAM in the Ethernet domain, e.g. see the patent application Ser. No. 10/248,761 and Ser. No. 10/248,858. The difficulty involves implementing Ethernet OAM first, then bridging EOAM with ATM OAM.

So, besides integrating (interworking) regular traffic data between Ethernet and ATM, it is also advantageous to integrate OAM failure notification between the two separate networks. Moreover, it is also advantageous to provide failure indications by a much faster and more reliable means.

SUMMARY OF THE INVENTION

The present invention provides a method for notifying/communicating at least one failure message from at least one source to at least one destination, the source served by a first network and the destination served by a second network. The method includes receiving at an interworking facility a first frame which includes a failure notification message and a first destination address in a first format compatible with said first network, forming a second frame of a second format compatible with the second network, the second frame including the failure notification message and mapping the first destination address to a second destination address specifying in the second format the address of the destination in the second network so that the second network, upon receipt of the second destination address, can route the second frame to the destination.

The present invention also provides a network system for notifying/communicating at least one failure message from at least one source to at least one destination. The system includes a first network associated with the source, generates a first frame includes a failure notification message and a first destination address in a first format compatible with the first network. Also included is a second network associated with the destination having a destination address and an interworking facility. The interworking facility receives the first frame, forms a second frame of a second format compatible with the second network, and maps the first destination address to a second destination address specifying in the second format the destination address in the second network, so that the second-network upon receipt of the second destination address routes the second frame to the destination, wherein the second frame includes the failure notification message.

DETAILED DESCRIPTION

The present invention provides a service that interworks two networking OAM protocols (Ethernet OAM and ATM OAM). It allows for failure notification of OAM packets observed in one domain (e.g. Ethernet) to be carried into the other domain (e.g. ATM) and vice versa. Specifically if a failure is detected in the Ethernet domain, OAM packets are forwarded on the failed VLAN in the Ethernet domain to the applicable PVC in the ATM domain. The Failure Notification scheme works essentially the same in the Ethernet-to-ATM direction. Customer equipment in either domain would get near Real Time notification of a failure independent of the domain.

Figure 1:
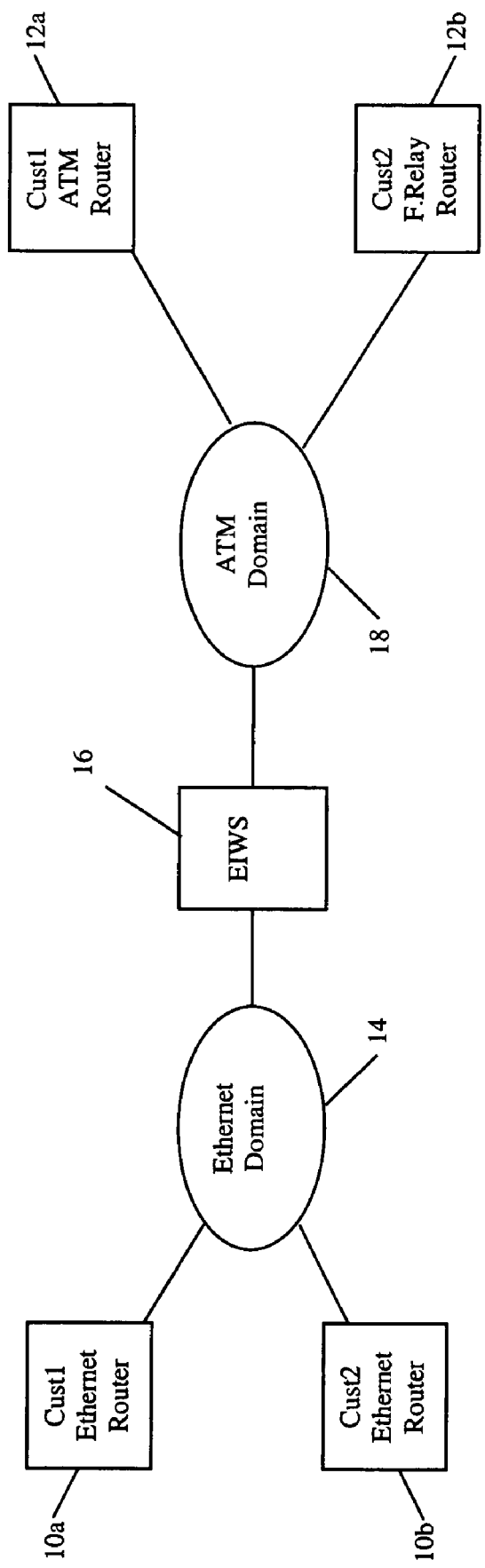
FIG. 1 shows a block schematic diagram of a prior art network architecture for interworking regular traffic data between two networks.

Referring to FIG. 1 depicts a block schematic diagram of a prior art network architecture 10 as shown in U.S. patent application Ser. No. 10/016,019 for interworking a source and destination that lie in first and second networks having different protocols to allow the source to send data using its own protocol by first establishing for the source a set of addresses in a format compatible with the destinations that lie in second network, and thereafter having an interworking facility act as a proxy between networks. In the embodiment of FIG. 1, the source 10 comprises a first router 10a and a second router 10b and the destination 12 comprises one of routers 12a and 12b. Broadly stated, in the illustrated embodiment, either the first router 10a or the second router 10b routes data in the form of Ethernet-formatted information frames onto an Ethernet-based Metropolitan Area Network (MAN) or Ethernet Domain 14 which comprises a first network, the router 12a routes data in the form of ATM-formatted information frames onto an ATM domain 18, which comprises a second network, and router 12b routes data in the form of Frame Relay formatted information frames which are converted [to ATM] at the edge of the ATM domain 18. The Ethernet domain 14 as shown provides network services to a plurality of customers and/or customer sites. For illustration purposes, FIG. 1 only shows two source routers 10a and 10b and two destination routers 12a and 12b, although any number of sources and destination sites may be shown connected to the Ethernet domain 14 and the ATM domain 18 respectively.

To enable transmission of the data to one of the destination routers 12a and 12b that lie outside the first network, the Ethernet network 14 transmits each Ethernet-formatted information frame destined for one of the routers 12a and 12b to an Ethernet InterWorking Switch (EIWS) 16 for transmission to the Wide Area ATM core network 18 (a second) network that serves the routers 12a and 12b as discussed below. The EIWS 16 functions as an interworking facility typically comprising an Ethernet switch that serves as a proxy between the Ethernet network 14 and the ATM network 18 which services a plurality of edge devices that utilize one of a plurality of protocols, such as ATM or Frame Relay.

In practice, the interworking facility establishes a set of pseudo addresses in a format compatible with the first network that correspond to destinations in the second network so that the source can address an information frame using its own protocol for a destination that actually lies in the second network without concerning itself with the protocol employed in the second network. In the case where the first information frame comes from a source in an Ethernet-based network, the first information frame will have a Virtual Local Area Network (VLAN) tag associated with the address of the destination. On the other hand, if the information frame comes from a source in an ATM Virtual Private network (VPN), the frame will include a Virtual Path Identifier (VPI)/Virtual Channel Identifier (VCI), herein after referred to as a Permanent Virtual Circuit (PVC) that corresponds to the address of (e.g., the network path to) the destination in a format compatible with the ATM network, even though the destination lies in another network having a different protocol.

Upon receipt of the first traffic failure frame at the interworking facility, the facility forms a second frame compatible with the second network, the second frame including the traffic failure. The destination address of the first frame is mapped to a second destination address compatible with the second network. Thus, for example, the VLAN tag in an originating Ethernet frame is mapped to a VPN PVC for an ATM frame and vice versa. Mapping the destination address from a format compatible with the first traffic failure frame to a format compatible with the second traffic failure frame allows propagation of the second frame, including the information embodied in its traffic failure, to the destination.

Generally, two types of alarms are sent when error or failure is detected in the flow of traffic from one domain to the other domain. An alarm indication signal (AIS) is generated which sends a message in the same, i.e. forward direction as that of the signal to the effect that an error or failure has been detected. A Remote Defect Indication (RDI) is generated which sends a message back to a transmitting terminal that a failure (AIS) has been indicated, i.e. received.

FIGS. 2-12 show transmission of traffic failure notifications upon detection of traffic failures in different areas of the network architecture of FIG. 1.

Figure 2:
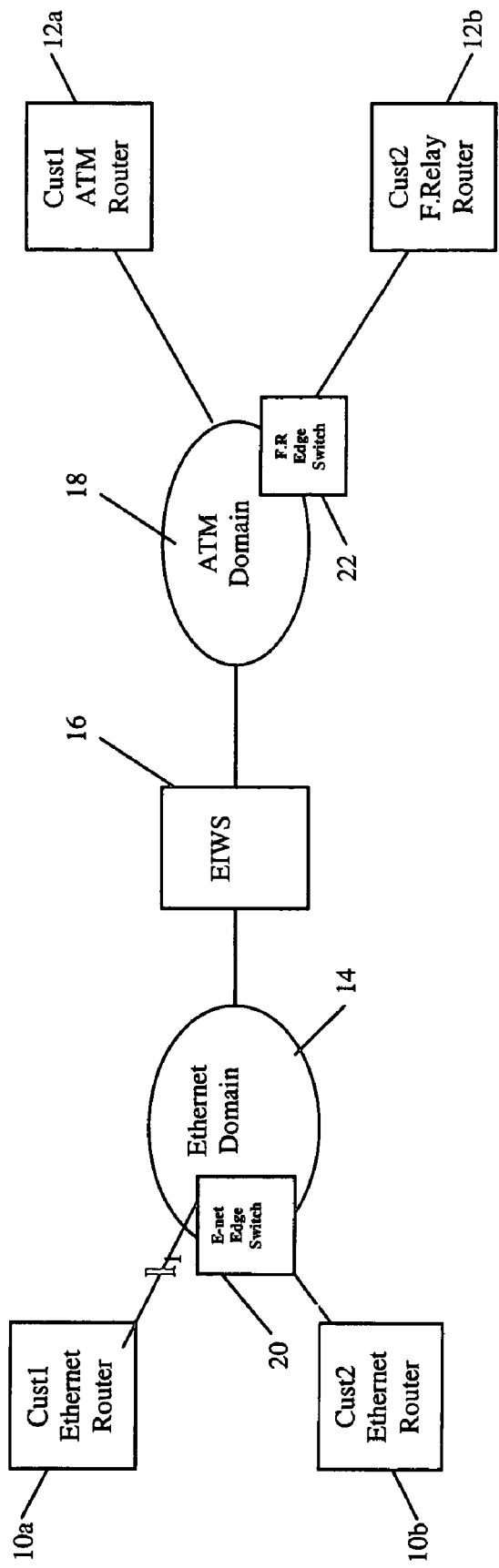
FIG. 2 shows a block schematic diagram comprising part of the network architecture of FIG. 1 and the manner in which the link failure notification is transmitted from a source to a destination.

Referring to FIG. 2 of the present invention, there is shown a block schematic diagram comprising part of the network architecture of FIG. 1 and the manner in which the link failure notification is transmitted from a source to a destination. Link failure $l_1$ occurs on a link in the Ethernet domain 14. In this case, the failure is detected on a $R_x$ port of Ethernet Edge Switch 20 facing the Ethernet router 10a. The Ethernet edge switch 20 recognizes that this failure is on the Green VLAN, and generates an Ethernet OAM AIS (EOAM.AIS) message and forwards it towards the EIWS 16 on the Green VLAN. Upon receipt of the EOAM.AIS message, EIWS 16 performs two functions. One, EIWS 16 sends an EOAM.RDI message on the Green VLAN back towards the Ethernet router 10a notifying the router 10a of the link failure $l_1$ detection. Two, EIWS converts the EOAM.AIS message on the Green VLAN into an ATM.AIS message on the Green PVC as described below. AIS is in the same 'forward direction' as the traffic flow direction where the error was detected, it signals the detection of an outage condition. Whereas, the RDI is a response in the reverse direction to receiving the AIS error message (i.e. "I have received a message about an error condition") rather than the actual error detection.

EIWS 16 operates to interwork the Ethernet frames with the ATM frames to facilitate the actual transmission of failure notification as described herein below. When EIWS 16 receives traffic failure message from the Ethernet Network 14, it opens the message/packet to determine the VLAN tag embodied in the packet for the purpose of matching the VLAN tag to a PVC path of the ATM network 18. To match the VLAN tag to an ATM PVC, the EIWS 16 uses a PVC-VLAN mapping table (not shown) that cross references VLAN tags to corresponding ATM PVC VPI/VCI values. By mapping the VLAN tag to the corresponding ATM PVC, the EIWS 16 effectively converts the Ethernet address into an ATM address.

Referring back to FIG. 2, when EIWS 16 receives the EOAM.AIS message on Green VLAN from Ethernet network 14, it maps the Green VLAN to Green PVC of the ATM network 18, using the PVC-VLAN mapping table. It recognizes this packet as an EOAM.AIS message, and converts it to an ATM.AIS message on the appropriate PVC. EIWS 16 then forwards the ATM.AIS message to the ATM network 18. The ATM network 18 then forwards the ATM.AIS message towards the ATM router 12a on the Green PVC. The ATM router 12a receives the ATM.AIS message, processes the failure notification, and takes the subinterface corresponding to the Green PVC out of service. In other words, the IP address associated with Green PVC is no longer available for data transmission. Also, Cust 1 ATM Router 12a, per ATM protocol, responds with an ATM.RDI packet on the Green PVC. This ATM.RDI packet is an acknowledgement by Cust 1 ATM Router 12a that it has successfully received the failure notification message. The ATM.RDI packet on the Green PVC is transmitted through the ATM domain 18 to the EIWS 16. The EIWS 16 receives the ATM.RDI message for the Green PVC and converts into EOAM.RDI message for the Green VLAN and forwards it to the Ethernet router 10a. Note that the EOAM.RDI message is a redundant message reiterating the link failure detection. The Ethernet domain 14 is not limited to a single Ethernet service provider and, for purposes of the present invention, may consist of multiple Ethernet service providers (ESPs). In such a case, the layer two device "facing" the edge router 10a, namely switch 20 in FIG. 2, would aggregate traffic from multiple Ethernet service providers.

Figure 3:
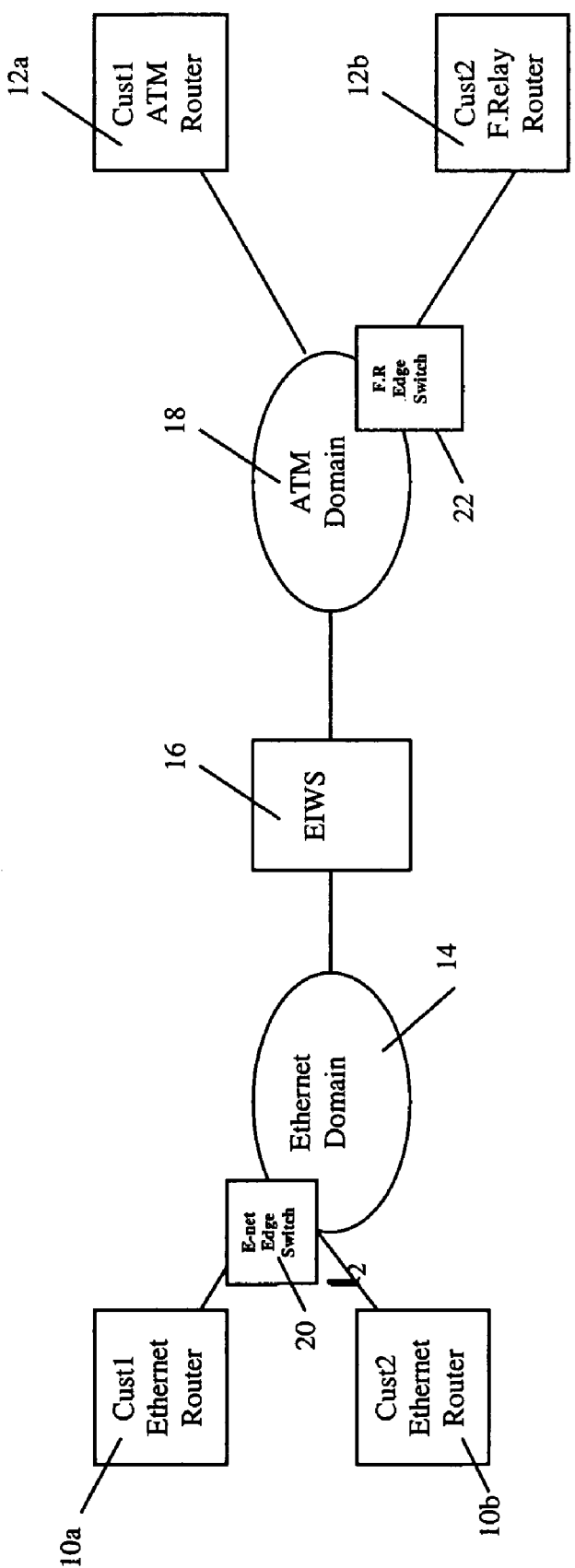
FIG. 3 shows a block schematic diagram comprising part of the network architecture of FIG. 1 and the manner in which the link failure notification is transmitted from a source to a destination.

Referring to FIG. 3 of the present invention, there is shown a block schematic diagram comprising part of the network architecture of FIG. 1 and the manner in which the link failure notification is transmitted from a source to a destination. Link failure 12 occurs on a link in the Ethernet domain 14 between router 10b and edge switch 20 (Red VLAN). In this case, the failure is also detected on the $R_x$ port Ethernet Edge Switch 20 facing the Ethernet router 10b. An Ethernet OAM AIS (EOAM.AIS) message is generated by the Ethernet edge switch 20 and sent towards the EIWS 16 on the Red VLAN. Again, EIWS 16 performs two functions. One, EIWS 16 sends an EOAM.RDI message on the Red VLAN back towards the Ethernet router 10b notifying the router 10b of the link failure 12 detection. Second, EIWS 16 maps the EOAM.AIS message into an ATM.AIS message, and forwards the ATM.AIS message to the ATM domain 18 on to the applicable PVC (Red PVC) based on the PVC-VLAN mapping table. Since, in this case the network path is on the Red PVC, the ATM network 18 then forwards the ATM.AIS message towards the frame relay (FR) edge switch 22. The FR edge switch 22 receives the ATM.AIS message and converts it into the equivalent frame relay (F.R.) OAM (a/k/a LMI—Link Management Interface) message indicating the Red PVC has gone into an inactive state. This state change is signaled in a message called an Asynchronous Status message, with the Activity bit (A-bit) set to 0. The Cust2 F.R. router 12b receives this F.R. OAM message, and takes the subinterface associated with the Red PVC out of service. In other words the IP address of the Red PVC is no longer available for data transmission. The FR edge switch 22 also generates an ATM.RDI message on the Red PVC back towards the EIWS 16. The EIWS 16 receives the ATM.RDI message for the Red PVC. It converts it into an EOAM.RDI message for the Red VLAN and forwards it to the Ethernet router 10b.

Figure 4:
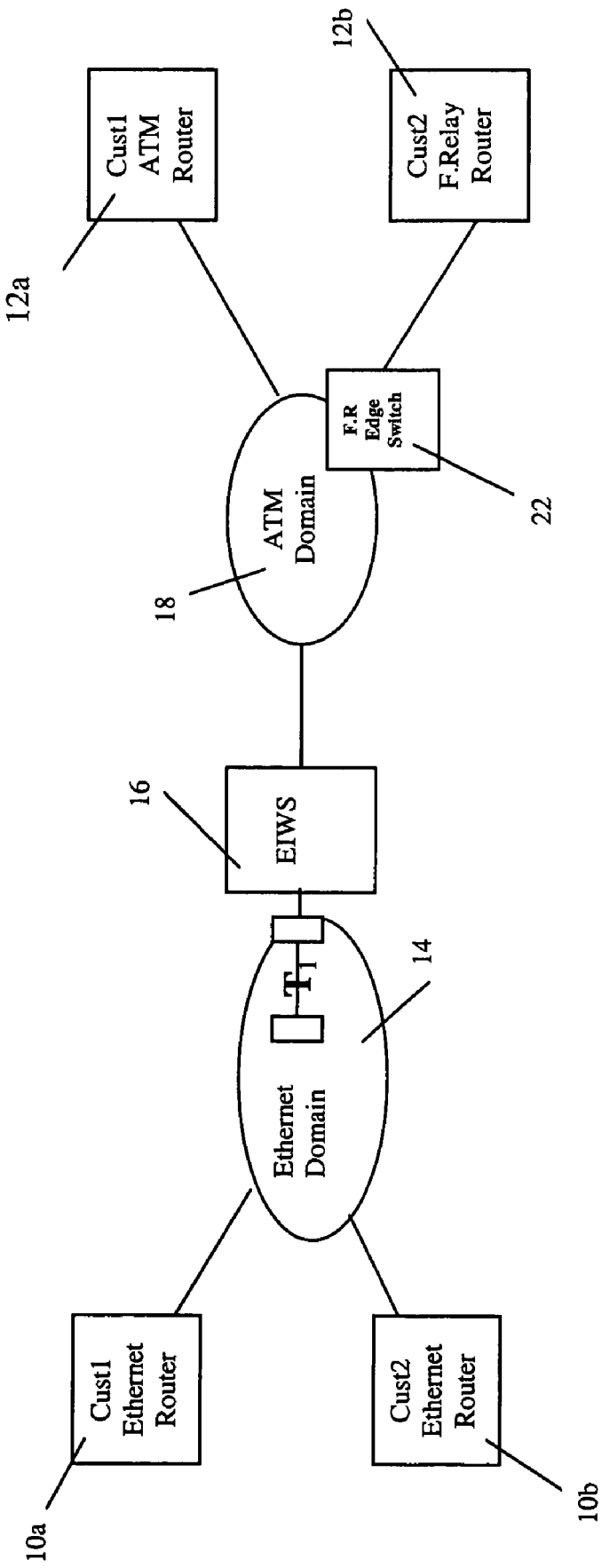
FIG. 4 shows a block schematic diagram comprising part of the network architectures of FIG. 1 and the manner in which the trunk failure detected in the Ethernet domain 14 is transmitted.

Referring to FIG. 4 of the present invention, there is shown a block schematic diagram comprising part of the network architectures of FIG. 1 and the manner in which the trunk failure detected in the Ethernet domain 14 is transmitted. Trunk failure $T_1$ occurs in the Ethernet domain 14 that carries multiple VLANs as discussed above. $T_1$ indicates multiple customer traffic failures have occurred, since more than one customer circuit is carried on the trunk. In this case, the failure is detected on the $R_x$ port of a switch in the Ethernet domain for traffic data being transmitted from the source, routers 10a and 10b to the destination, routers 12a and 12b. An EOAM.AIS message is generated in the Ethernet domain 14 towards the EIWS 16 on both the Green and Red VLANs. The behavior of the network for Green VLANs is similar to the one described in FIG. 2 and for the Red VLANs is similar to the one described in FIG. 3.

Figure 5:
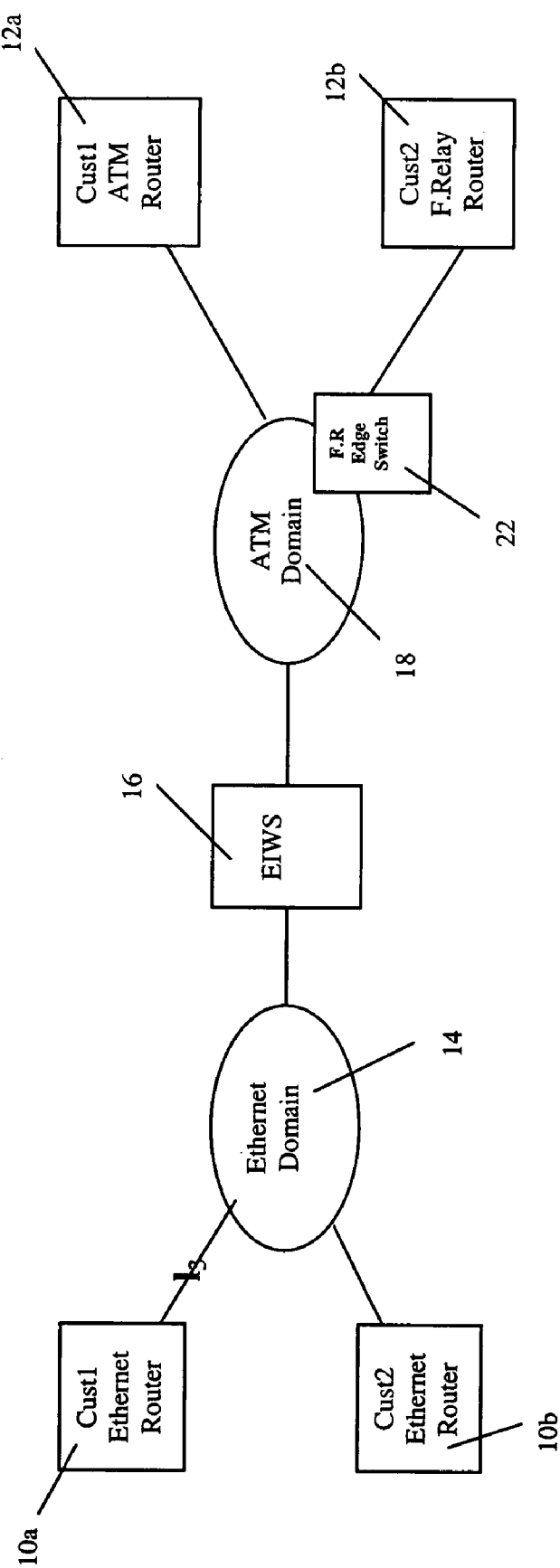
FIG. 5 shows a block schematic diagram comprising part of the network architecture of FIG. 2 and the manner in which the link failure notification is transmitted from a source to a destination.

Referring to FIG. 5 of the present invention, there is shown a block schematic diagram comprising part of the network architecture of FIG. 2 and the manner in which the link failure notification is transmitted from a source to a destination. Link failure 13 occurs in the Ethernet domain 14 for router 10a (Green VLAN) similar to the one in FIG. 2, however, in this case the failure is detected on an Rx port of the Ethernet router 10a. The Ethernet Cust1 Router 10a generates an EOAM.RDI message and transmits the same from the Ethernet Domain 14 towards the EIWS 16 on the Green VLAN. The EIWS 16 maps the EOAM.RDI message into an ATM.RDI message, and forwards the ATM.RDI message to ATM network 18 on Green PVC based on the PVC-VLAN mapping table. The ATM network 18 then forwards the ATM.RDI message towards the ATM router 12a. Upon receipt of the ATM.RDI message, the ATM router 12a processes the failure notification, and may take the subinterface associated with the Green PVC out of service. It is to be noted that because the link failure $1_3$ was detected by the Cust1 Ethernet Router 10a itself, an AIS message was not generated simply because the function of the AIS message is to notify the Cust1 Ethernet Routers of the link failure.

Figure 6:
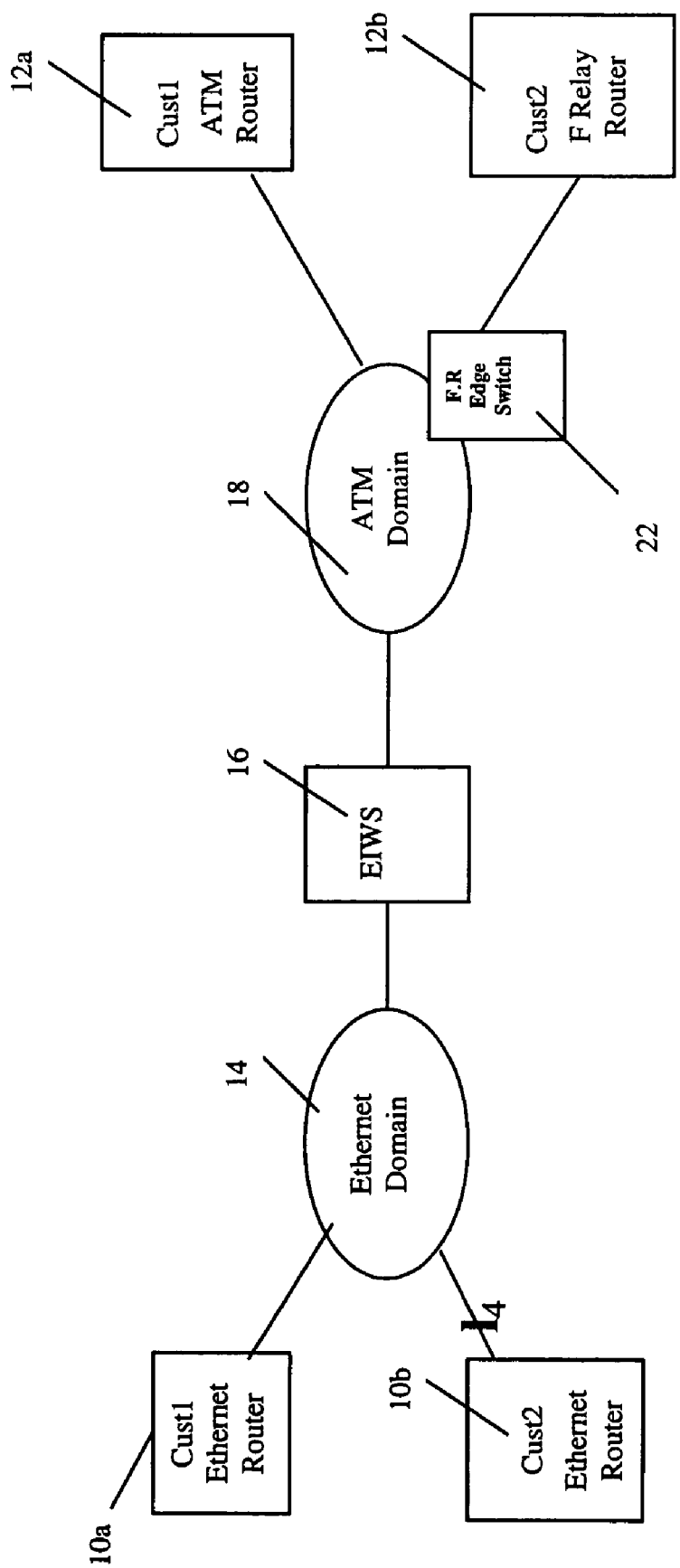
FIG. 6 shows a block schematic diagram comprising part of the network architecture of FIG. 3 and the manner in which the link failure notification is transmitted from a source to a destination.

Referring to FIG. 6 of the present invention, there is shown a block schematic diagram comprising part of the network architecture of FIG. 3 and the manner in which the link failure notification is transmitted from a source to a destination. Link Failure $1_4$ occurs on a link in the Ethernet domain 14 for router 10b (Red VLAN) similar to the one in FIG. 3, however, in this case, the failure is detected on the Rx port of the Ethernet Router 10b. An EOAM.RDI message is generated by the Ethernet Cust2 Router 10b and transmitted towards the EIWS 16 on the Red VLAN. EIWS 16 maps the EOAM.RDI message into an ATM.RDI message, and forwards the ATM.RDI message on to the applicable PVC (Red PVC) based on the PVC-VLAN mapping table. The ATM network 18 then forwards the ATM.RDI message towards the Frame Relay Edge Switch 22. The F.R. Edge Switch 22 receives the ATM.RDI message. It may create a Frame Relay LMI update on the Red PVC indicating Abit=FAIL as indicated in FIG. 2 and forward the same to the F.R. router 12b notifying of the link failure $l_4$ detection. Again, note that since the link failure $l_4$ was detected by the Cust2 Ethernet Router 10b, the AIS message is not generated.

Figure 7:
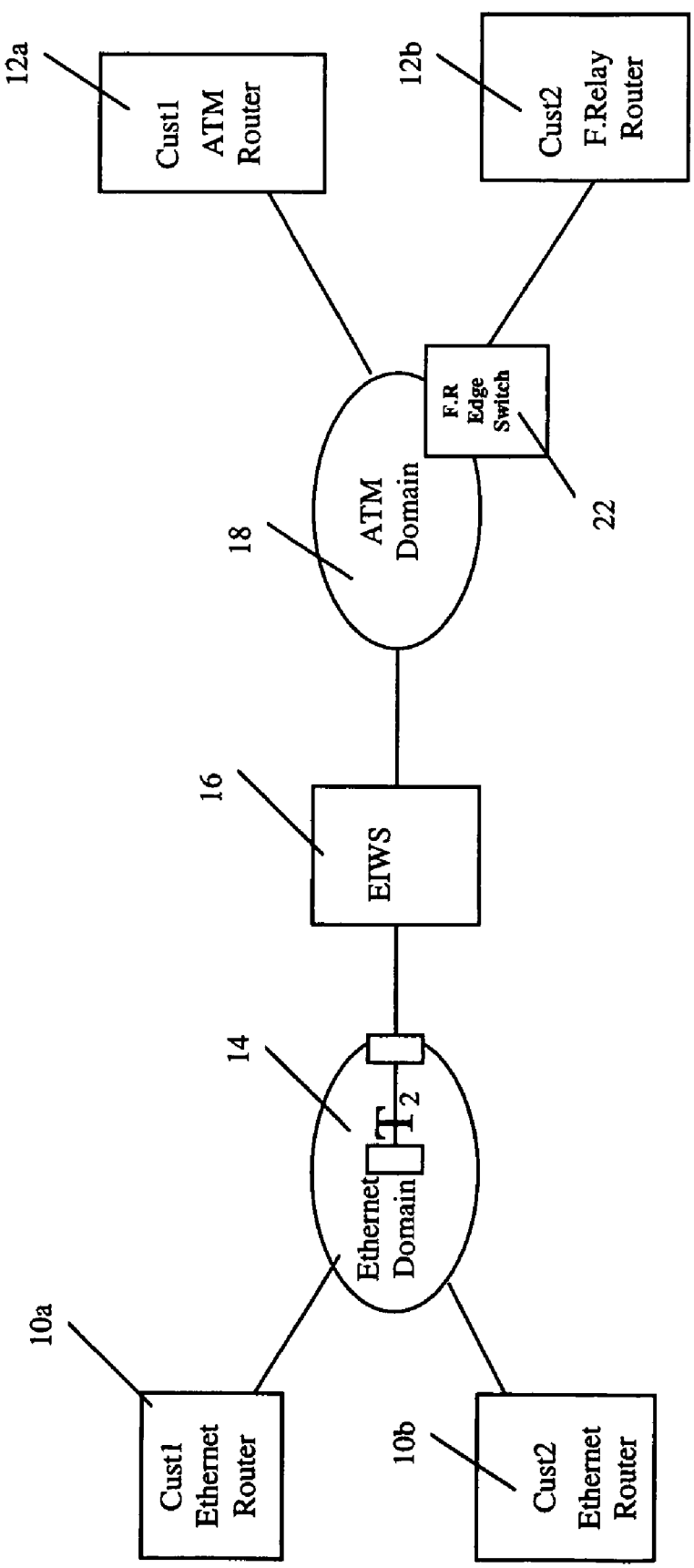
FIG. 7 shows a block schematic diagram comprising part of the network architecture of FIG. 4 and the manner in which the trunk failure detected in the Ethernet domain 14 is transmitted.

Referring to FIG. 7 of the present invention, there is shown a block schematic diagram comprising part of the network architecture of FIG. 4 and the manner in which the trunk failure detected in the Ethernet domain 14 is transmitted. A Trunk Failure ($T_2$) occurs in the Ethernet domain 14 that carries multiple VLANs. In this case, the failure is detected on the Rx port of the switch in the Ethernet domain 14 for traffic data being transmitted from the destination, routers 12a and 12b to the source routers 10a and 10b. An EOAM.AIS message is generated in the Ethernet domain 14 both on the Green and Red VLANs towards the Ethernet Customer Routers 10a and 10b respectively. Both Customer Routers 10a and 10b receive the EOAM.AIS messages and in turn generate their own EOAM.RDI messages towards the EIWS domain 14. The behavior of the network for Green VLAN is similar to the one described in FIG. 5 and for the Red VLAN is similar to the one described in FIG. 6.

Figure 8:
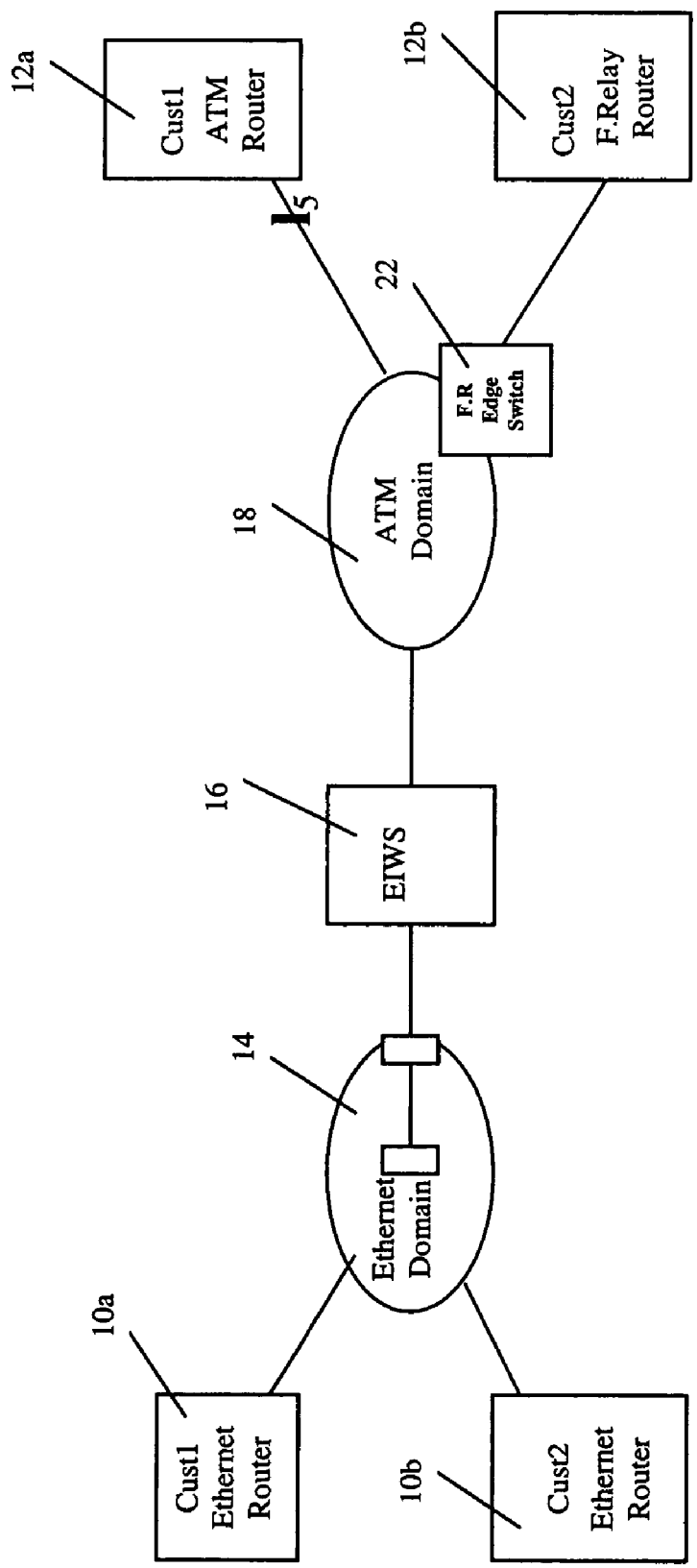
FIG. 8 shows a block schematic diagram comprising part of the network architecture of FIG. 1 and the manner in which the link failure notification is transmitted from a destination to a source.

Referring to FIG. 8 of the present invention, there is shown a block schematic diagram comprising part of the network architecture of FIG. 1 and the manner in which the link failure notification is transmitted from a destination to a source. Link Failure ($l_5$) occurs on a link in the ATM domain 18 for ATM Router 12a (Green PVC). In this case, the failure is detected on the Rx port of the ATM Router 12a. An ATM.RDI packet is generated by the ATM router 12a towards the EIWS 16 on the Green PVC. In this case, EIWS 16 interworks ATM frames to Ethernet frames. When EIWS 16 receives the ATM.RDI message on Green PVC from the ATM network 18, it maps the Green PVC to Green VLAN of the Ethernet Domain 14 using the PVC-VLAN mapping table and converts the ATM.RDI message to EOAM.RDI message, thereby essentially reversing the process described previously with reference to FIG. 3. EIWS 16 then forwards the EOAM.RDI message to the Ethernet network 14 which is then forwarded to the Ethernet router 10a.

Figure 9:
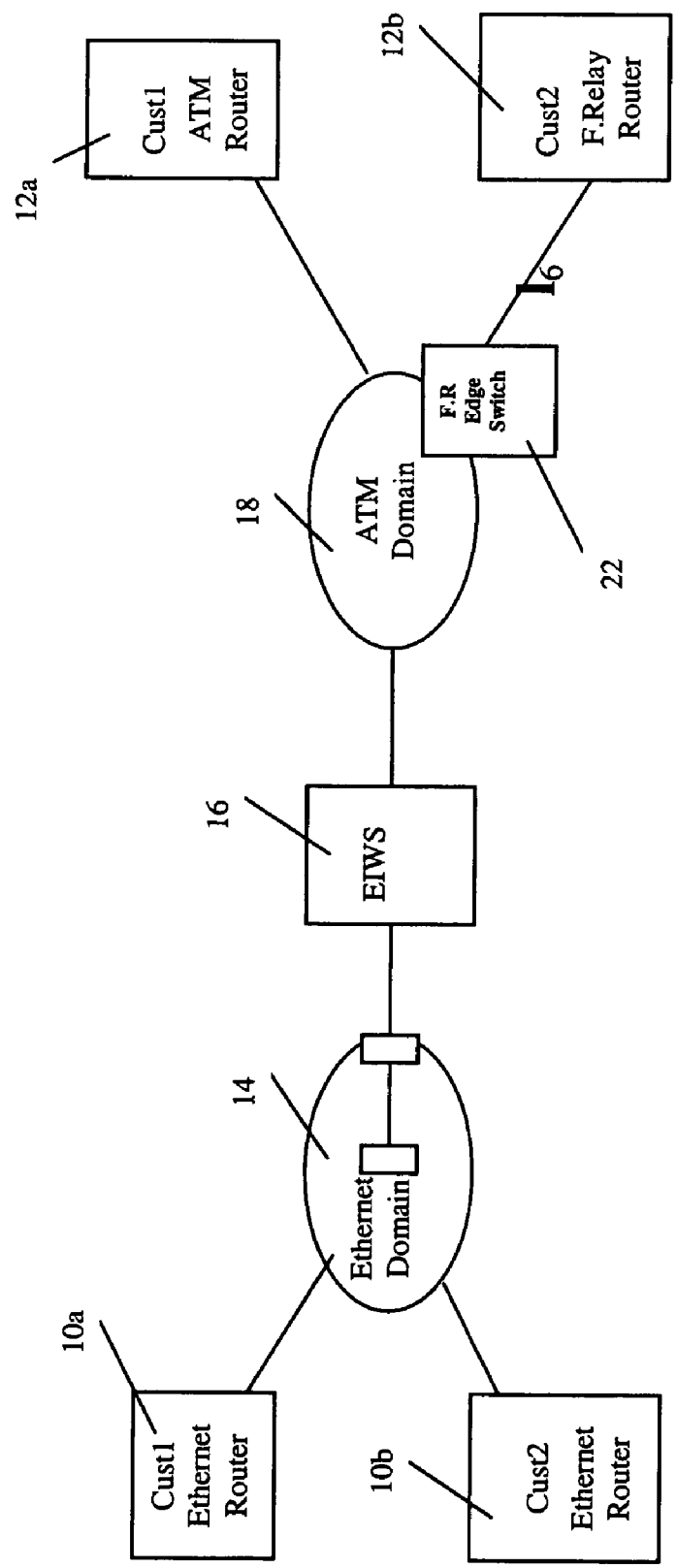
FIG. 9 shows a block schematic diagram comprising part of the network architecture of FIG. 1 and the manner in which the link failure notification is transmitted from a destination to a source.

Referring to FIG. 9 of the present invention, there is shown a block schematic diagram comprising part of the network architecture of FIG. 1 and the manner in which the link failure notification is transmitted from a destination to a source. Link Failure ($l_6$) occurs on the Frame Relay link for FR router 12b (Red PVC). The failure is detected at both the FR Edge Switch 22 and the FR Router 12b. The F.R Edge Switch 22 generates an ATM.AIS message on the Red PVC towards the EIWS 14. The EIWS 14 performs two functions. One, it generates an ATM.RDI message and sends it back to the ATM domain 18 which in turn forwards the ATM.RDI message towards the FR Router 12b on the Red PVC. Since the link failure occurred on both the FR edge switch and router 12b, the router never receives this second LMI failure update. The ATM.RDI message is an acknowledgement by the EIWS 14 that it has successfully received the failure notification message. Second, the EIWS 16 receives the ATM.AIS message and maps it into an EOAM.AIS message. It then forwards the EOAM.AIS message on to the applicable VLAN (Red VLAN) based on the PVC-VLAN mapping table. The EOAM.AIS message is received at the Ethernet Router 10b via the Ethernet Domain 14. The Ethernet router 10b receives the EOAM.AIS message, processes the failure, and takes the subinterface associated with the Red VLAN out of service. In other words, the IP address associated with Red VLAN is no longer available for data transmission. Also, the Ethernet Router 10b per Ethernet protocol responds with an EOAM.RDI message and sends the same into the Ethernet domain 14 on the Red VLAN. The Ethernet domain 14 forwards the message to the EIWS 16. The EIWS 16 receives the EOAM.RDI message for the Red VLAN and generates an ATM.RDI message for the Red PVC and forwards it to the F.R. Edge Switch 22. The F.R. Edge Switch 22 receives the ATM.RDI message. However, since the link between the FR Edge Switch 22 and the ATM router 10b has been disconnected, it does nothing with the RDI message.

Figure 10:
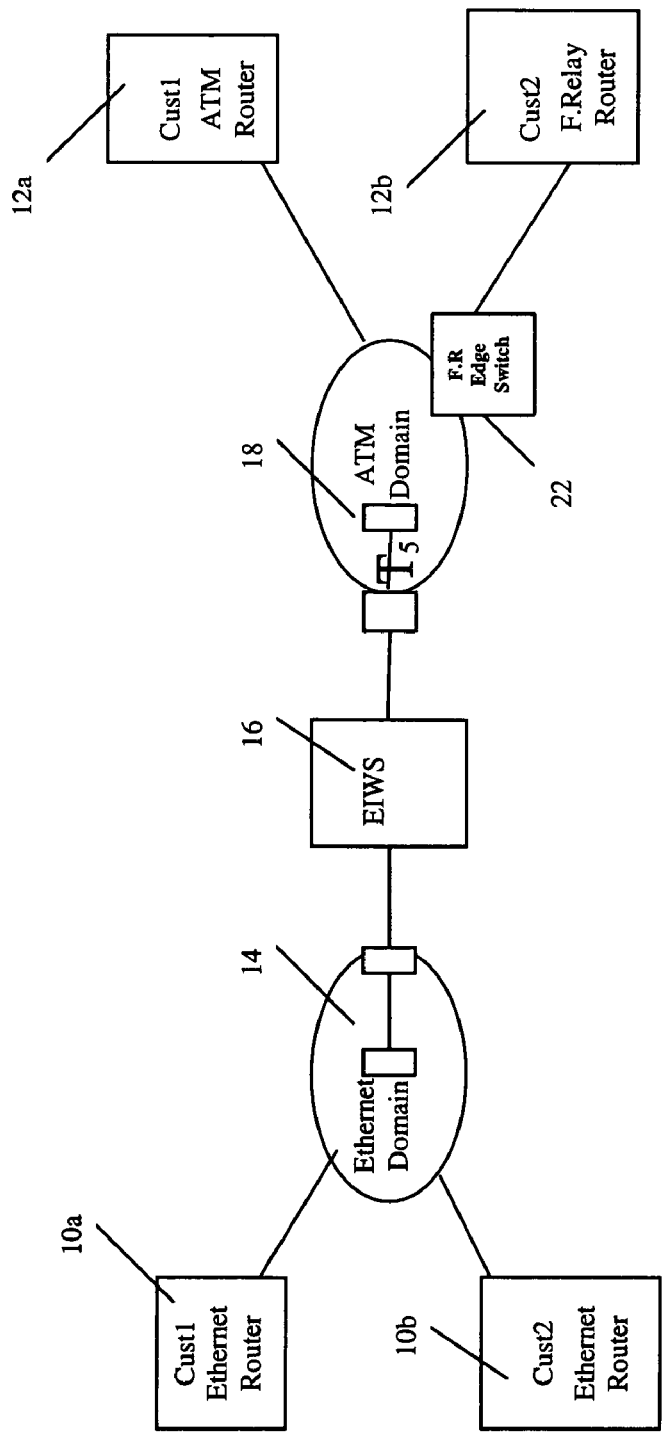
FIG. 10 shows a block schematic diagram comprising part of the network architecture of FIG. 1 and the manner in which the trunk failure detected in the ATM domain 18 is transmitted.

Referring to FIG. 10 of the present invention, there is shown block schematic diagram comprising part of the network architecture of FIG. 1 and the manner in which the trunk failure detected in the ATM domain 18 is transmitted. A Trunk Failure ($T_3$) occurs in the ATM domain 18 that carries multiple PVCs. In this case, the failure is detected on the Rx port of an ATM switch in the ATM domain 18 for traffic data being submitted from the source routers 10a and 10b to the destination routers 12a and 12b. The ATM Network 18 immediately generates ATM.AIS messages on both Green and Red PVCs towards the ATM/FR routers 12a and 12b respectively. The ATM router 12a receives the ATM.AIS message, processes the failure, and takes the subinterface associated with the Green PVC out of service. When the F.R. Edge Switch 22 (Red PVC) receives the ATM.AIS message, it converts it into an LMI message with Abit=Fail. It then forwards the LMI message to the F.R. router 12b. The F.R. Router 12b receives the message, processes the failure, and takes the subinterface associated with the RED PVC out of service. The ATM router 12a responds with an ATM.RDI message for the Green PVC. Likewise, the F.R. Edge Switch 22 responds with an ATM.RDI message for the Red PVC. Both RDI messages are forwarded to the EIWS 16 via the ATM Domain 18 on their respective PVCs. The EIWS 16 maps the ATM.RDI messages into EOAM.RDI messages and forwards the EOAM.RDI messages on to the applicable VLANs based on the PVC-VLAN mapping table.

The EOAM messages of the trunk failure notification are received at the applicable Ethernet Routers 10a and 10b on the Green and Red VLANs respectively.

Figure 11:
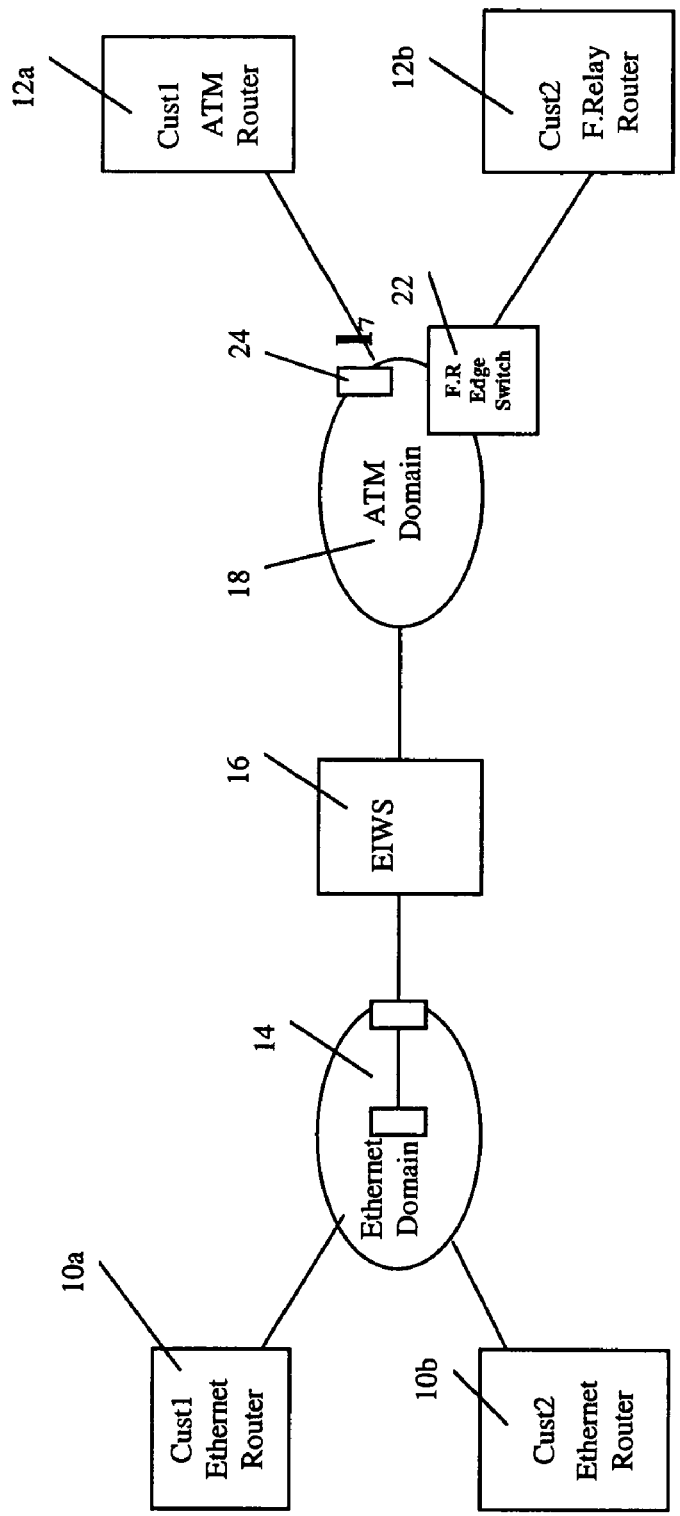
FIG. 11 shows a block schematic diagram comprising part of the network architecture of FIG. 1 and the manner in which the link failing notification is transmitted from a destination to the source.

Referring to FIG. 11 of the present invention, there is shown block schematic diagram comprising part of the network architecture of FIG. 1 and the manner in which the link failure notification is transmitted from a destination to the source. Link Failure ($l_7$) occurs in the ATM domain 18 between ATM edge switch 24 and ATM router 12a (Green PVC). In this case, the failure is detected on the Rx port of an ATM Switch 24. The ATM Domain 18 generates an ATM.AIS message on the Green PVC towards the EIWS 16. The EIWS 16 performs two functions. One, it generates an ATM.RDI message back into the ATM domain 18 towards the ATM Router 12a. Second, the EIWS 16 maps the ATM.AIS message into an EOAM.AIS message. It then forwards the EOAM.AIS message on to the applicable VLAN (Green VLAN) based on the PVC-VLAN mapping table. The EOAM.AIS message is received at the Ethernet Router 10a. The Ethernet router 10a receives the EOAM message, processes the failure, and takes the subinterface associated with the Green VLAN out of service. The Ethernet Router 10a responds with an EOAM.RDI message on the Green VLAN. This EOAM.RDI message is an acknowledgement by Cust1 Ethernet Router 10a that it has successfully received the failure notification message. The EOAM.RDI message on the Green VLAN is transmitted through the Ethernet domain 14 towards the EIWS 16. The EIWS 16 receives the EOAM.RDI message and generates a ATM.RDI message into the ATM domain 18. The ATM domain 18 then forwards the message to the ATM Router 12a. Note that the ATM.RDI message is a redundant message reiterating the link failure detection.

Figure 12:
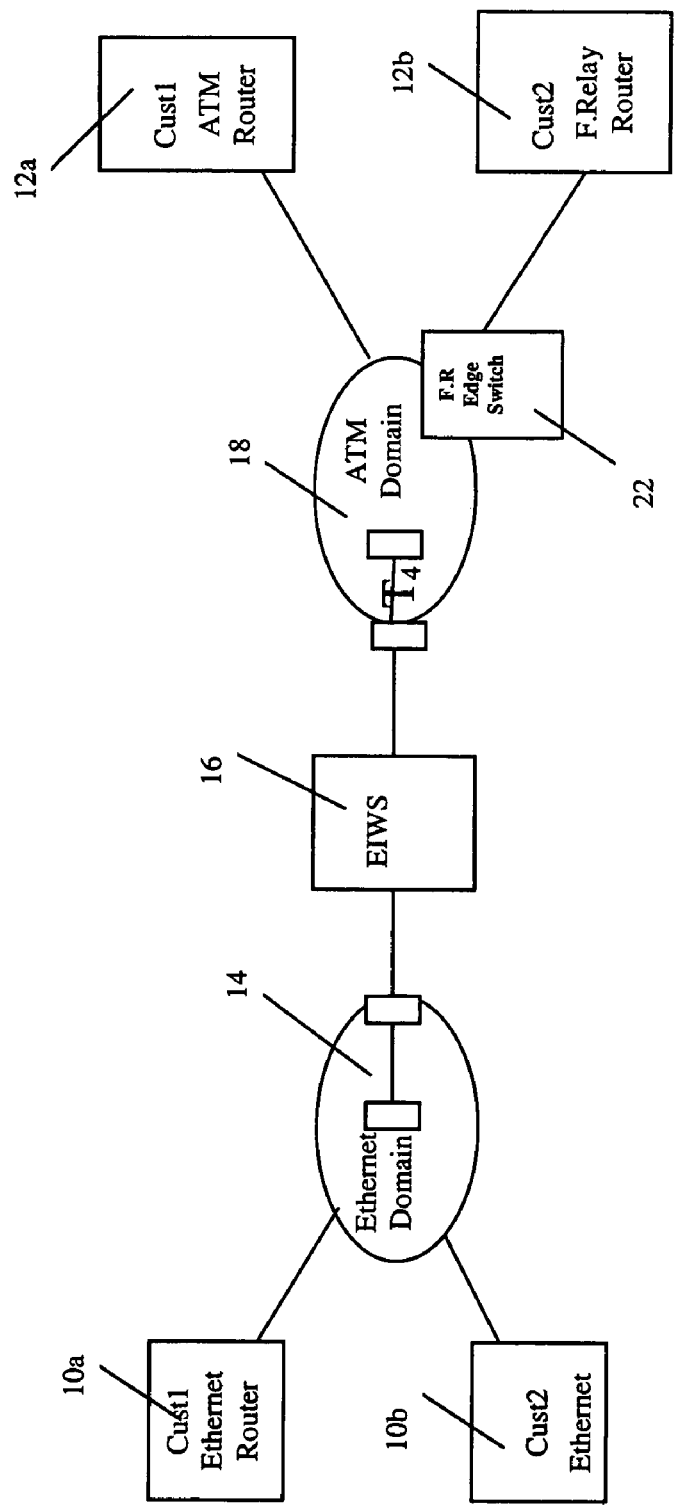
FIG. 12 shows a block schematic diagram comprising part of the network architecture of FIG. 1 and the manner in which the trunk failure detected in the ATM domain 18 is transmitted.

Referring to FIG. 12 of the present invention, there is shown a block schematic diagram comprising part of the network architecture of FIG. 1 and the manner in which the trunk failure detected in the ATM domain 18 is transmitted. A Trunk Failure ($T_4$) occurs in the ATM domain 18 that carries multiple PVCs. In this case, the failure is detected on the Rx port of the ATM switch for traffic data flowing towards the EIWS. The ATM Network 18 generates ATM.AIS messages towards the EIWS 16 for both Green and Red PVCS. EIWS 16 converts the ATM.AIS messages into EOAM.AIS messages and transmits EOAM.AIS messages on both Green and Red VLANs. EIWS 16 also sends ATM.RDI messages back toward routers 12a and 12b (see FIGS. 9 & 11).

It will be apparent that the present invention has been described herein with reference to certain preferred or exemplary embodiments. The preferred or exemplary embodiments described herein may be modified, changed, added to, or deviated from without departing from the intent, spirit and scope of the present invention, and it is intended that all such additions, modifications, amendments and/or deviations be included within the scope of the following claims.

What is claimed is:

1. A method for notifying/communicating at least one failure message from at least one source to at least one destination, the source served by a first network and the destination served by a second network, comprising the steps of:
   receiving at an interworking facility a first frame which includes a failure notification message and a first destination address in a first format compatible with said first network;
   forming a second frame of a second format compatible with the second network, the second frame including the failure notification message; and
   mapping the first destination address to a second destination address specifying in the second format the address of the destination in the second network so that the second network, upon receipt of the second destination address, can route the second frame to the destination;
   wherein the first frame has an Ethernet format; wherein the first destination address comprises a Virtual Local Area Network (VLAN) tag within the Ethernet-formatted first frame; wherein the second frame has an Asynchronous Transport (ATM) format; and wherein the second destination address comprises an ATM Permanent Virtual Circuit (PVC) tag;
   wherein the interworking facility interworks the Ethernet format frames with the ATM format frames by the steps of:
      receiving at the interworking facility an Ethernet formatted first frame with the corresponding VLAN tag; matching the VLAN tag of the first destination with the corresponding PVC VPI/VCI values of the second destination address using table; converting the Ethernet-format frame to the ATM format frame; and sending the ATM format frame with the corresponding PVC tag to the destination served by the second network.

2. The method according to claim 1, wherein said failure notification message includes automated Operations, Administration and Management traffic.

3. The method according to claim 1 wherein the mapping of the first destination address to the second destination address comprises the step of mapping the VLAN tag to the ATM PVC VPI/VCI values.

4. The method according to claim 1 wherein the first frame has an Asynchronous Transport (ATM) format and wherein the first destination address comprises an ATM PVC VPI/VCI.

5. The method according to claim 4 wherein the second frame has an Ethernet format and wherein the second destination address comprises a VLAN tag within the Ethernet-formatted first frame.

6. The method according to claim 5 wherein the mapping of the first destination address to the second destination address comprises the step of mapping the ATM PVC VPI/VCI to the VLAN tag.

7. A method for notifying/communicating at least one failure message from at least one source to at least one destination, the source served by a first network and the destination served by a second network, comprising the steps of:
   receiving at an interworking facility a first frame which includes a failure notification message and a first destination address in a first format compatible with said first network;
   forming a second frame of a second format compatible with the second network, the second frame including the failure notification message; and
   mapping the first destination address to a second destination address specifying in the second format the address of the destination in the second network so that the second network, upon receipt of the second destination address, can route the second frame to the destination;
   wherein the first frame has an Asynchronous Transport (ATM) format; wherein the first destination address comprises an ATM PVC VPI/VCI; wherein the second frame has an Ethernet format; and wherein the second destination address comprises a VLAN tag within the Ethernet-formatted first frame;
   wherein the mapping of the first destination address to the second destination address comprises the step of mapping the ATM PVC VPI/VCI to the VLAN tag;
   wherein the interworking facility interworks the ATM format frames with the Ethernet format frames by the steps of:
      receiving at the interworking facility an ATM-formatted first frame with the corresponding PVC VPI/VCI value;
      matching the VPI/VCI of the first destination address with the corresponding VLAN tag of the second destination address using a mapping table;
      converting the ATM-format frame to the Ethernet format frame; and
      sending the Ethernet format frame on the corresponding VLAN tag to the destination served by the second network.

8. The method of claim 1 wherein said failure notification message includes failure in a link between the source and the first network.

9. The method of claim 8 wherein said link failure is detected by the source.

10. The method of claim 8, wherein said link failure is detected by the first network.

11. The method of claim 8 wherein said source is an Ethernet router and said first network is an Ethernet network.

12. The method of claim 8, wherein said source is an ATM router and first network is an ATM network.

13. The method of claim 1 wherein said failure notification message includes multiple failures in links between the sources and the first network.

14. The method of claim 13 wherein said multiple link failures are detected by the first network.

15. The method of claim 14 wherein said first network is an Ethernet network.

16. The method of claim 14 wherein said first network is an ATM network.

* * * * *